United States Patent
Kang (10) Patent No.: US 7,304,284 B2
(45) Date of Patent: Dec. 4, 2007

(54) APPARATUS FOR MONITORING A LAMP, SYSTEM HAVING THE SAME FOR MONITORING A LAMP, BACKLIGHT ASSEMBLY HAVING THE SAME AND LIQUID CRYSTAL DISPLAY APPARATUS HAVING THE SAME

(75) Inventor: Nam-Soo Kang, Ansan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 199 days.

(21) Appl. No.: 10/922,516

(22) Filed: Aug. 19, 2004

(65) Prior Publication Data

US 2005/0051700 A1    Mar. 10, 2005

(30) Foreign Application Priority Data

Sep. 4, 2003    (KR) .................. 10-2003-0061883

(51) Int. Cl.
*G01J 1/32*    (2006.01)
(52) U.S. Cl. ...................... 250/205; 250/239
(58) Field of Classification Search ............... 250/205, 250/239, 214.1; 315/149, 158, 159
See application file for complete search history.

(56) References Cited

U.S. PATENT DOCUMENTS

| | | | | |
|---|---|---|---|---|
| 6,144,216 A * | 11/2000 | Kajiwara et al. | ........... | 324/770 |
| 6,580,221 B2 * | 6/2003 | Hutzler et al. | .............. | 315/149 |
| 7,126,576 B2 * | 10/2006 | Kim et al. | .................. | 345/102 |
| 2004/0174333 A1 * | 9/2004 | Kim et al. | .................. | 345/102 |

* cited by examiner

*Primary Examiner*—Que T Le
(74) *Attorney, Agent, or Firm*—MacPherson Kwok Chen & Heid LLP; Tom Chen (57) ABSTRACT

An apparatus for monitoring a lamp includes a base body, a sensor and a signal transfer pattern. The base body includes a first face having a first region corresponding to a lamp and a first peripheral region disposed around the first region, and a second face having a second region corresponding to the first region and a second peripheral region corresponding to the first peripheral region. The sensor is disposed in the first region, and outputs a sensing signal in response to a working status of the lamp. The signal transfer pattern is disposed in the second peripheral region, and transfers the sensing signal. Therefore, the apparatus for monitoring the lamp senses abnormal working lamps, so that normally working lamps may be protected from being damaged, shortening of lifetime, causing a fire, etc.

32 Claims, 12 Drawing Sheets

APPARATUS FOR MONITORING A LAMP, SYSTEM HAVING THE SAME FOR MONITORING A LAMP, BACKLIGHT ASSEMBLY HAVING THE SAME AND LIQUID CRYSTAL DISPLAY APPARATUS HAVING THE SAME

CROSS-REFERENCE TO RELATED APPLICATIONS

This application relies for priority upon Korean Patent Application No. 2003-61883 filed on Sep. 4, 2003, the contents of which are herein incorporated by reference in its entirety.

BACKGROUND OF THE INVENTION

1. Field of the Invention

The present invention relates to an apparatus for monitoring a lamp, system having the apparatus for monitoring a lamp, a backlight assembly having the apparatus and a liquid crystal display apparatus having the apparatus for monitoring the lamp. More particularly, the present invention relates to an apparatus for monitoring the lamp that senses a working status of the lamp and prevents the apparatus from malfunctioning due to a signal interference, a system for monitoring the lamp having the above-mentioned apparatus for monitoring the lamp, a backlight assembly having the above-mentioned apparatus for monitoring the lamp and a liquid crystal display apparatus having the above-mentioned apparatus for monitoring the lamp.

2. Description of the Related Art

Generally, when an electric field is applied to liquid crystal, an arrangement of liquid crystal is adjusted, so that optical transmittance of the liquid crystal is changed.

A liquid crystal display (LCD) apparatus uses the liquid crystal to convert an electrical signal into a visible image.

The LCD apparatus has merits such as lightweight and small size compared to a cathode ray tube typed (CRT) display apparatus. However, the LCD apparatus has a problem that the LCD apparatus may not operate in a dark place since the liquid crystal cannot generate a light spontaneously.

Recently, LCD apparatuses capable of displaying an image in a dark place have been developed. Most of the LCD apparatuses that are recently developed have a lamp. The LCD apparatus having a small or medium display size may display an image of high display quality only by using one lamp or two lamps.

Number of the lamps is increased when display size of the LCD apparatus is increased. Generally, about ten to twenty lamps are required for large size LCD apparatus. The large size LCD apparatus having ten to twenty lamps may be improved in brightness, however, the large size LCD apparatus has various problems due to using a plurality of lamps. High manufacturing cost, large size and heavy weight of the LCD apparatus are resulted from an increase of the number of driving apparatus supplying a driving power to the lamp corresponding to the number of the lamps.

Recently, an LCD apparatus having a plurality of lamps that are connected to each other and disposed in parallel to each other has been developed. The lamps are turned-on simultaneously by using one or two driving apparatuses.

Accordingly, the LCD apparatus may advantageously decrease the number of required lamp driving apparatuses. However, when one of the lamps is turned off, other lamps are overloaded, so that a lifetime of properly working lamps is decreased and damage or fire of the properly working lamps may occur.

SUMMARY OF THE INVENTION

The present invention provides an apparatus for monitoring a lamp that senses a working status of a plurality of lamps that are connected in parallel to each other to sense an abnormally working lamp.

The present invention provides a system for monitoring a lamp that senses a working status of a plurality of lamps connected in parallel to each other so as to sense an abnormally working lamp and turn-off normally working lamps to protect the lamps.

The present invention provides a backlight assembly having the above-mentioned apparatus for monitoring a lamp.

The present invention provides a liquid crystal display apparatus having the above-mentioned apparatus for monitoring a lamp.

In an exemplary apparatus of the present invention for monitoring a lamp, the apparatus for monitoring the lamp includes a base body, a sensor and a signal transfer pattern. The base body includes a first face and a second face corresponding to the first face. The sensor is disposed on the first face and configured to output a sensing signal in response to a working status of the lamp. The signal transfer pattern is disposed on the second face and transfers the sensing signal.

In an exemplary system of the present invention for monitoring a lamp, the system for monitoring the lamp includes an apparatus for monitoring the lamp and a signal processing apparatus. The apparatus for monitoring the lamp includes a sensor disposed on a first region of a first face in a base body and configured to output a sensing signal in response to a working status, and a signal transfer pattern configured to transfer the sensing signal generated from the sensor. The signal processing apparatus outputs a control signal involved in the working status of the lamp by comparing the sensing signal with a reference signal.

In an exemplary backlight assembly of the present invention for monitoring a lamp, the backlight assembly includes a receiving container, a lamp assembly, an apparatus for monitoring the lamp and a sensing signal processing module. The receiving container includes a bottom face. The lamp assembly includes a lamp disposed on an inner surface of the bottom face and generating a light, and a driving power transferring module transferring a driving power to the lamp. The apparatus for monitoring the lamp includes a base body disposed between the bottom face and the lamp, a sensor disposed on a first region of a first face in a base body and configured to output a sensing signal in response to a working status, and a signal transfer pattern configured to transfer the sensing signal generated from the sensor. The sensing signal processing module generates a control signal controlling on/off of the driving power supplied to the lamp in response to the sensing signal.

In an exemplary liquid crystal display apparatus of the present invention for monitoring a lamp includes a receiving container, a lamp assembly, an apparatus for monitoring the lamp, a sensing signal processing module and a liquid crystal display panel. The receiving container includes a bottom face. The lamp assembly includes a lamp disposed on an inner surface of the bottom face and generating a light, and a driving power transferring module transferring a driving power to the lamp. The apparatus for monitoring the lamp includes a base body disposed between the bottom face and the lamp, a sensor disposed on a first region of a first face in a base body and configured to output a sensing signal in response to a working status, and a signal transfer pattern configured to transfer the sensing signal generated from the sensor. The sensing signal processing module generates a control signal controlling on/off of the driving power supplied to the lamp in response to the sensing signal. The liquid crystal display panel is fixed to the receiving container and converts the light into an image light having information.

According to the present invention, the apparatus for monitoring a lamp senses a working property of the lamps that are disposed in parallel to each other and operated by receiving the driving power, and the apparatus for monitoring the lamp blocks the driving power supplied to the lamp immediately when the working property of the lamps is significantly decreased, thus problems such as a damage of the lamp, shortening a lifetime of the lamp and a fire of the lamp may not occur.

BRIEF DESCRIPTION OF THE DRAWINGS

The above and other features and advantage points of the present invention will become more apparent by describing embodiments thereof in detail with reference to the accompanying drawings, in which.

DESCRIPTION OF THE EXEMPLARY EMBODIMENTS

Hereinafter, the exemplary embodiments of the present invention will be described in detail with reference to the accompanied drawings.

EXEMPLARY EMBODIMENTS OF APPARATUS FOR MONITORING A LAMP

Embodiment 1

Figure 1:
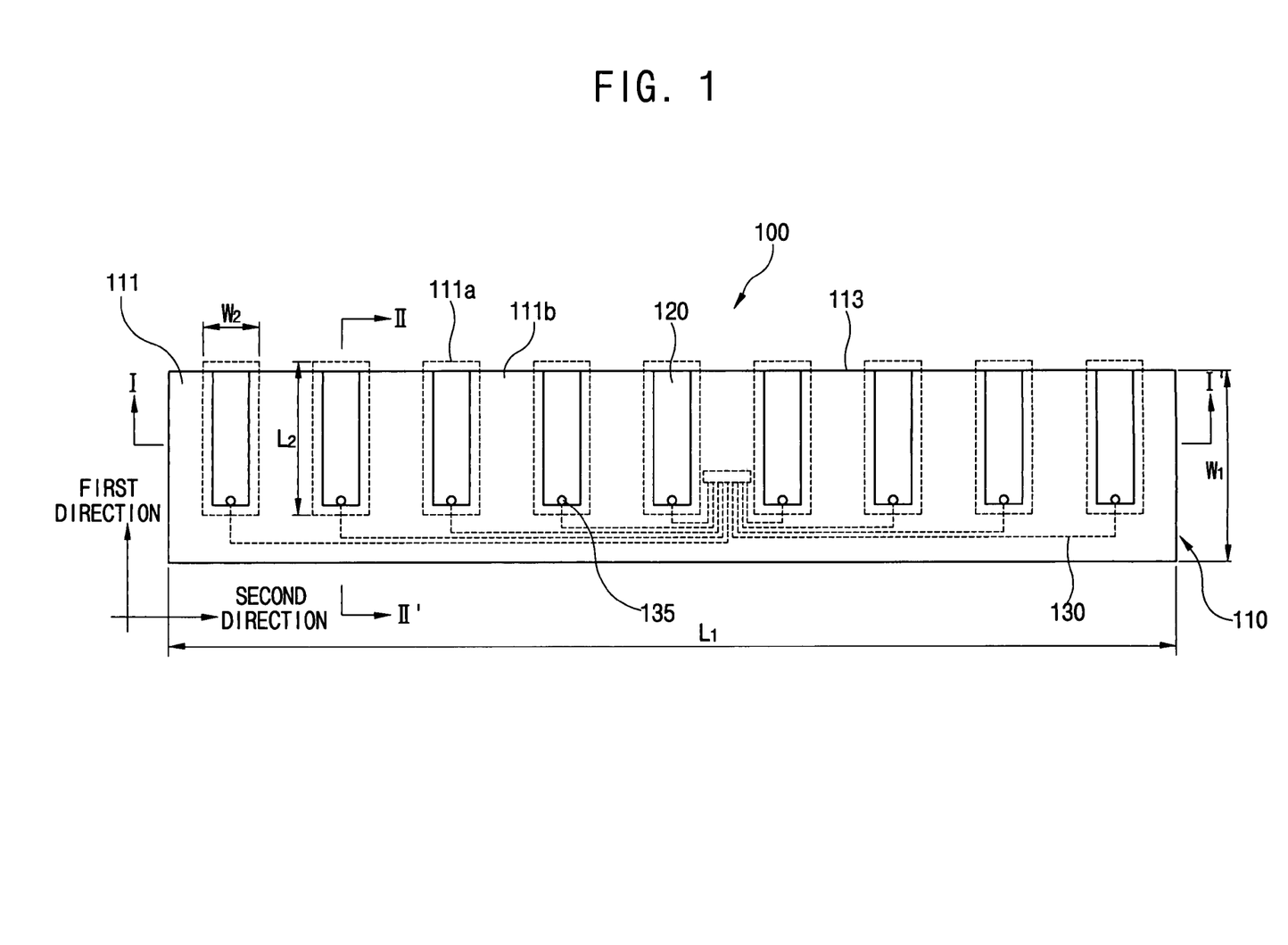
FIG. 1 is a plan view showing a first face of an apparatus for monitoring a lamp according to Embodiment 1 of the present invention.
Figure 2:
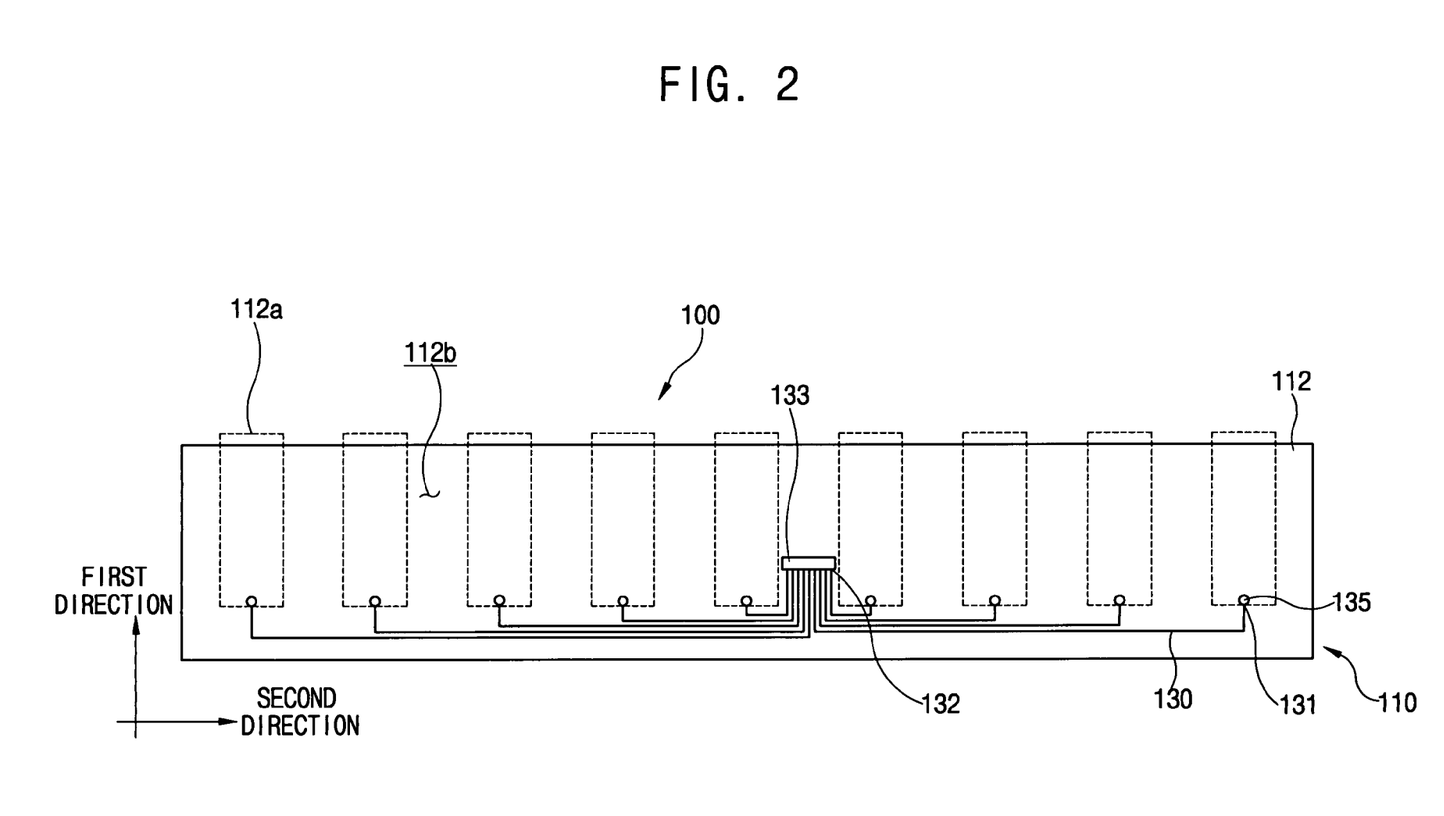
FIG. 2 is a plan view showing a second face of an apparatus for monitoring a lamp according to Embodiment 1 of the present invention.
Figure 3:
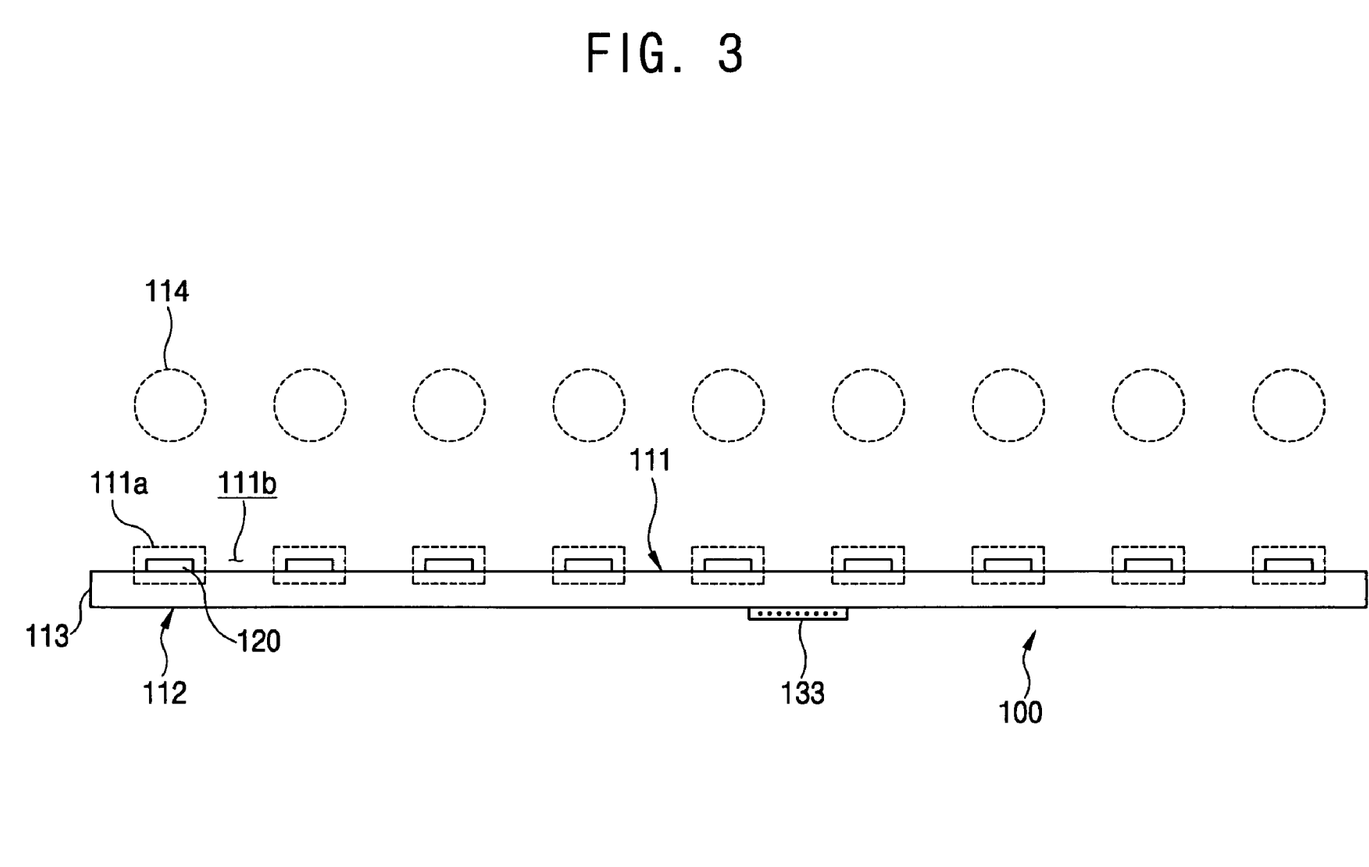
FIG. 3 is a cross-sectional view taken along the line I-I' of FIG. 1.

FIG. 1 is a plan view showing a first face of an apparatus for monitoring a lamp according to of the present embodiment. FIG. 2 is a plan view showing a second face of an apparatus for monitoring a according to the present embodiment. FIG. 3 is a cross-sectional view taken along the line I-I' of FIG. 1.

Referring to FIGS. 1 and 2, an apparatus for monitoring a lamp 100 includes a base body 110, a sensor 120 and a signal transfer pattern 130.

The base body 110 has a rectangular parallelepiped shape having a length L1 and a width W1. The base body 110 includes a first face 111, second face 112 opposite to the first face 111 and a side face 113 including four faces as shown in FIG. 1.

Referring now to FIG. 1, the first face 111 includes a first region 111a and a first peripheral region 111b.

Referring to FIGS. 1 and 3, the first region 111a is a region that corresponds to the lamp and the first peripheral region 111b is a remaining region excluding the first region 111a. The first region 111b extends in a first direction as shown in FIG. 1 and at least two first regions 111a are disposed in a second direction that is substantially perpendicular to the first direction. In this embodiment, the number of the first region 111a is no less than the number of the lamps. The first region 111a has a second length L2 and a second width W2. The second length L2 is preferably shorter than the first width W1 of the base body 110.

Referring now to FIG. 2, a second face 112 includes a second region 112a and a second peripheral region 112b. The second region 112a is a region that is opposite to the first region 111a, and the second peripheral region 112b is a remaining region excluding the second region 112a. Therefore, the second peripheral region 112b is opposite to the first peripheral region 111b.

Referring to FIGS. 1 and 3, the sensor 120 is disposed on each of the first regions 111a. The sensor 120 senses a working status of the lamp 114 to output various sensing signals in response to the working status of the lamp.

The sensor 120 generates the sensing signal due to an electromagnetic induction phenomenon. The sensor 120 is formed by patterning a conductive thin film disposed on the first face 111, and the conductive thin film may be copper thin film, aluminum thin film, etc.

Referring to FIGS. 2 and 3, the signal transfer pattern 130 transfers the sensing signal to an information processing device (not shown). The signal transfer pattern 130 is disposed on the second peripheral region 112b in the second face 112. Also, the signal transfer pattern 130 may be disposed on the first face 111. The signal transfer pattern 130 is formed by patterning the conductive thin film disposed on the second face 112 so as to form a wire shaped pattern, wherein the conductive thin film may be a copper thin film, a aluminum thin film, etc.

A width of each of the signal transfer patterns 130 and an interval between the signal transfer patterns 130 is preferably about 0.05 mm to about 0.15 mm. When the width and the interval of each of the signal transfer pattern 130 are reduced, a size and a weight of the base body 110 may be decreased.

Figure 4:
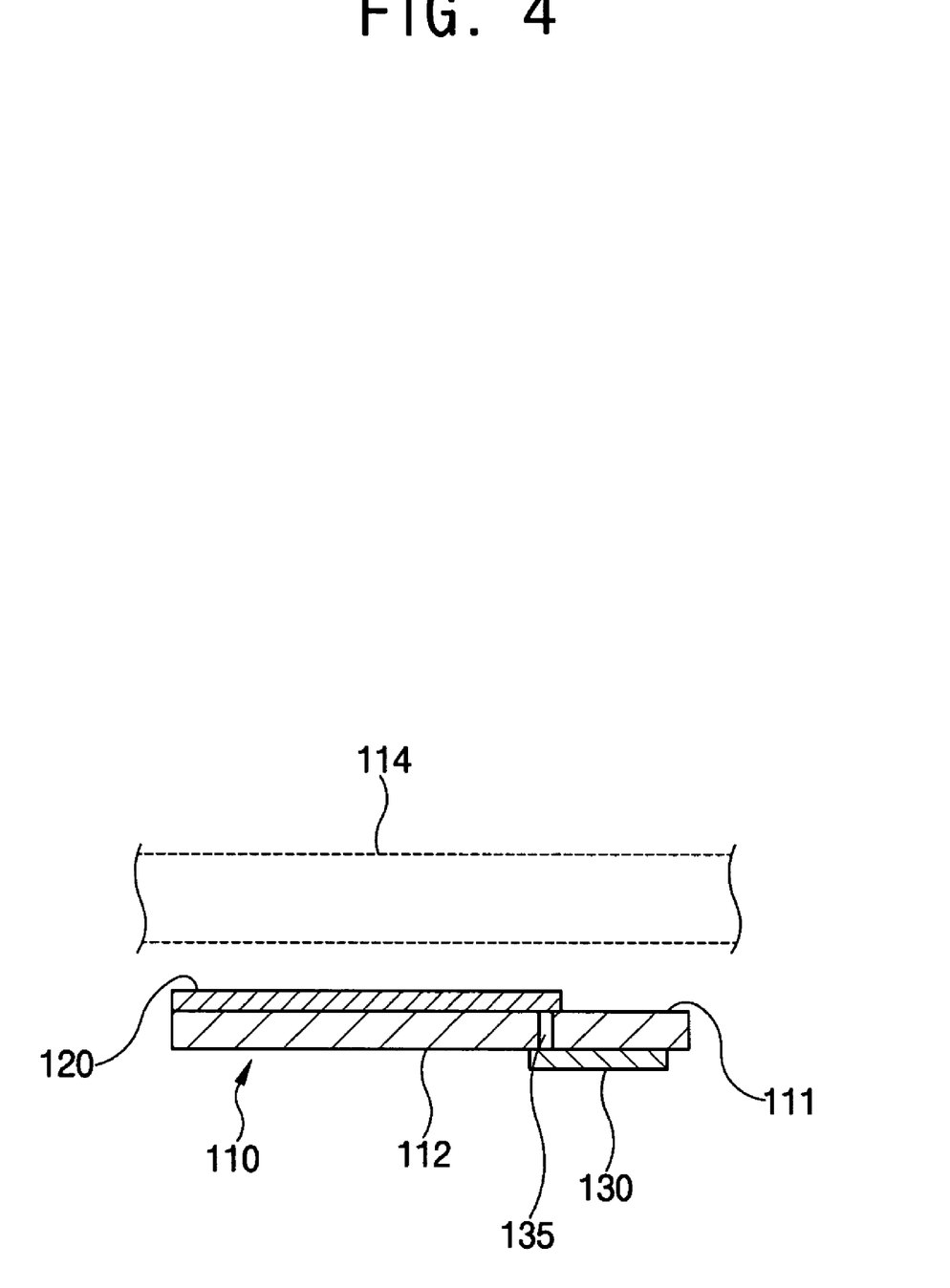
FIG. 4 is a cross-sectional view taken along the line II-II' of FIG. 1.

FIG. 4 is a cross-sectional view taken along the line II-II' of FIG. 1.

Referring to FIGS. 3 and 4, a first end 131 of the signal transfer pattern 130 that is disposed on the second face 112 is electrically connected to the sensor disposed in the first region 111a of the first face 111.

The base body 110 is an insulator having a great electrical resistance, so that a conductive via-hole 135 is formed on the base body 110 to connect the sensor 120 to the signal transfer pattern 130. The sensor 120 is electrically connected to the first end 131 of the signal transfer pattern 130.

A connector 133 is connected to a second end 132 that is connected to the first end 131 of each of the signal transfer patterns 130. The connector 133 is disposed on a center of the second face 112. The connector 133 may be disposed on other part than the center of the second face 112 or the side face 113 according to another embodiment.

Referring to FIGS. 1 and 2, the signal transfer pattern 130 and the sensor 120 may be disposed so that the signal transfer pattern 130 is not overlapped with the sensor 120.

In case that the sensor 120 disposed on the first face 111 and the signal transfer pattern 130 disposed on the second face 112 are overlapped with each other, a parasitic capacitance is generated between the base body 110 and the signal transfer pattern 130, so that the sensing signal outputted from the sensor 120 to the signal transfer pattern 130 may be distorted.

When the sensing signal outputted from the sensor 120 is distorted while passing through the signal transfer pattern 130, data processed by the information processing device is not accordance with a working status of the lamp, so that the reliability of the apparatus for monitoring a lamp may be decreased.

In the present embodiment, each of the signal transfer patterns 130 and sensors 120 is disposed so as not to be overlapped each other. However, in case that each of the signal transfer pattern 130 and the sensors 120 is partially overlapped due to a difficulty on designing, the signal transfer pattern 130 and the sensor 120 are preferably disposed in substantially perpendicular to each other. When the signal transfer pattern 130 and the sensor 120 are disposed substantially in perpendicular to each other, a distortion of the sensing signal passing through the signal transfer pattern 130, occur by signal interference may be minimized.

According to the present embodiment, the sensor 120 and the signal transfer pattern 130 may be disposed so that the sensor 120 and the signal transfer pattern 130 transferring the sensing signal outputted from the sensor 120 may not be overlapped or crossed each other, so that the reliability of the apparatus for monitoring a lamp 100 is maximized due to preventing the sensing signal in response to the working status of the lamp from distortion.

Embodiment 2

Figure 5:
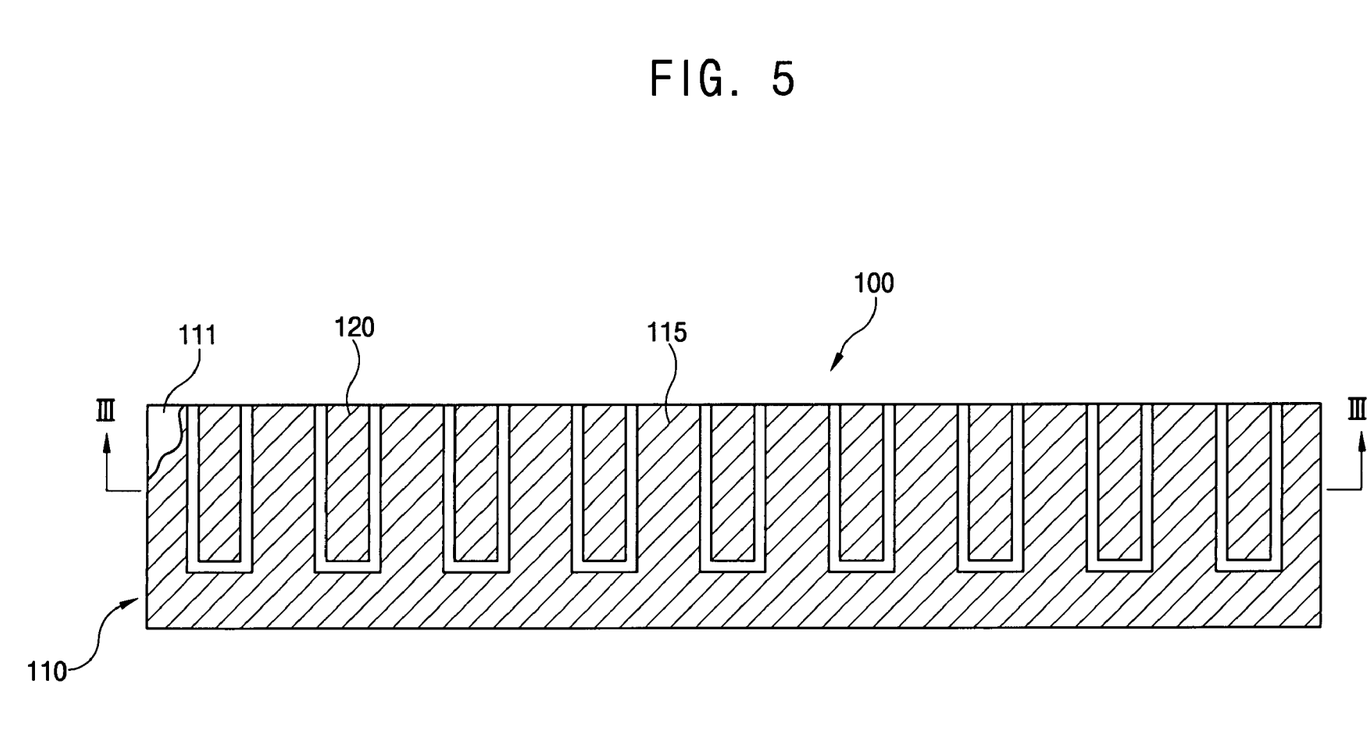
FIG. 5 is a plan view showing an apparatus for monitoring a lamp according to Embodiment 2 of the present invention.
Figure 6:
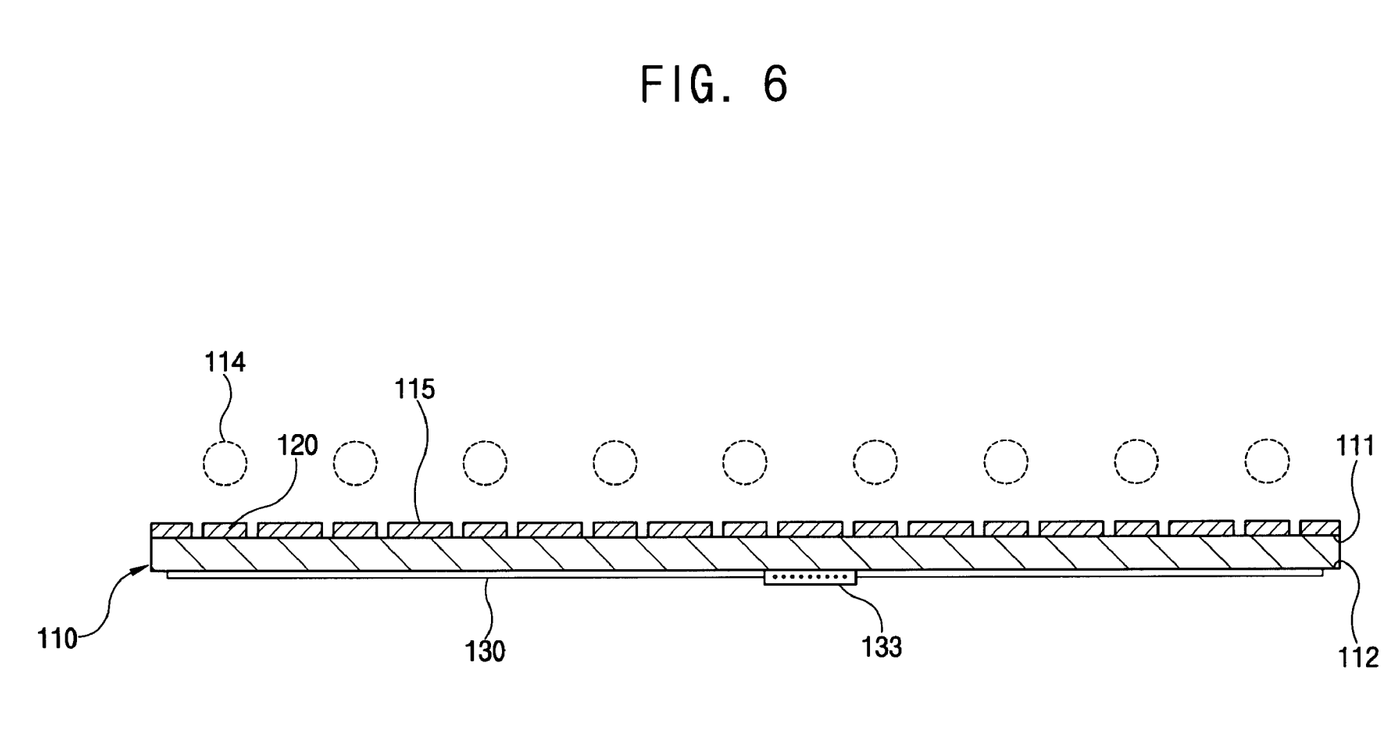
FIG. 6 is a cross-sectional view taken along the line III-III' of FIG. 5.

FIG. 5 is a plan view showing an apparatus for monitoring a lamp according to the present embodiment. FIG. 6 is a cross-sectional view taken along the line III-III' of FIG. 5. The apparatus of the present embodiment for monitoring the lamp is same as the apparatus in Embodiment 1 except for a noise-blocking pattern 115 disposed on the first peripheral region according to the Embodiment 1. Thus, the same reference numerals will be used to refer to the same or like parts as those described in Embodiment 1 and any further explanation will be omitted.

Referring to FIGS. 5 and 6, a noise-blocking pattern 115 is disposed in a first peripheral region 111b of a first face 111. The noise-blocking pattern 115 prevents a sensor 120 from outputting an abnormal sensing signal due to a magnetic field generated from a lamp 114 and a magnetic field applied from an exterior of the lamp. The noise-blocking pattern 115 includes a metal thin film such as a copper thin film, an aluminum thin film, an aluminum alloy thin film, etc. The noise-blocking pattern 115 is insulated from the sensors 112, and a part or whole of the noise-blocking pattern 115 is grounded.

The noise-blocking pattern 115 includes the same material of the sensor 120. That is, when the sensor 120 is formed by patterning a copper thin film, the noise-blocking pattern 115 is also formed by patterning the copper thin film, or when the sensor 120 is formed by patterning an aluminum thin film, the noise-blocking pattern 115 is also formed by patterning the aluminum thin film.

According to the present embodiment, the abnormal sensing signal due to the magnetic field generated from the lamp 114 and the magnetic field applied from an exterior of the lamp 114 is prevented by forming the noise-blocking pattern 115 around the sensor 120 that is disposed on the first face 111 of the base body 110, so that a reliability of an apparatus for monitoring the lamp 100 may be increased.

Embodiment 3

Figure 7:
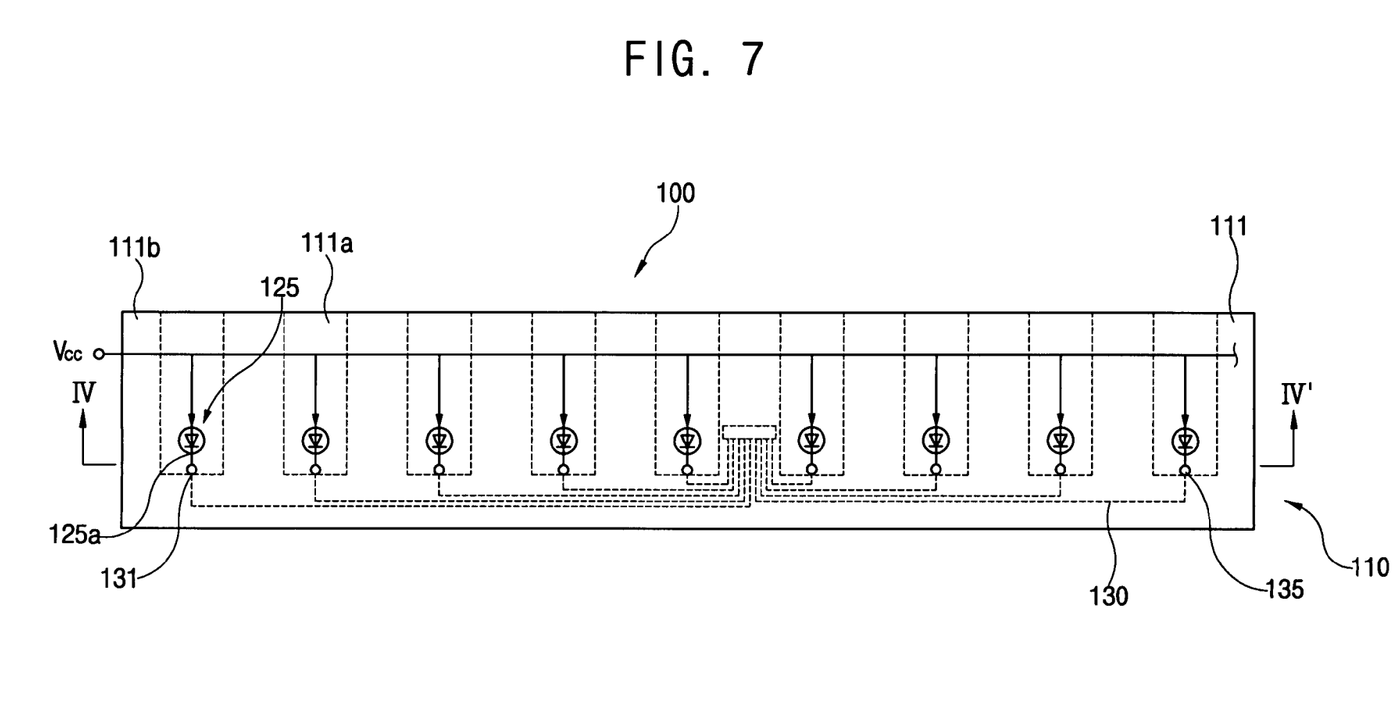
FIG. 7 is a plan view showing an apparatus for monitoring a lamp according to Embodiment 3 of the present invention.
Figure 8:
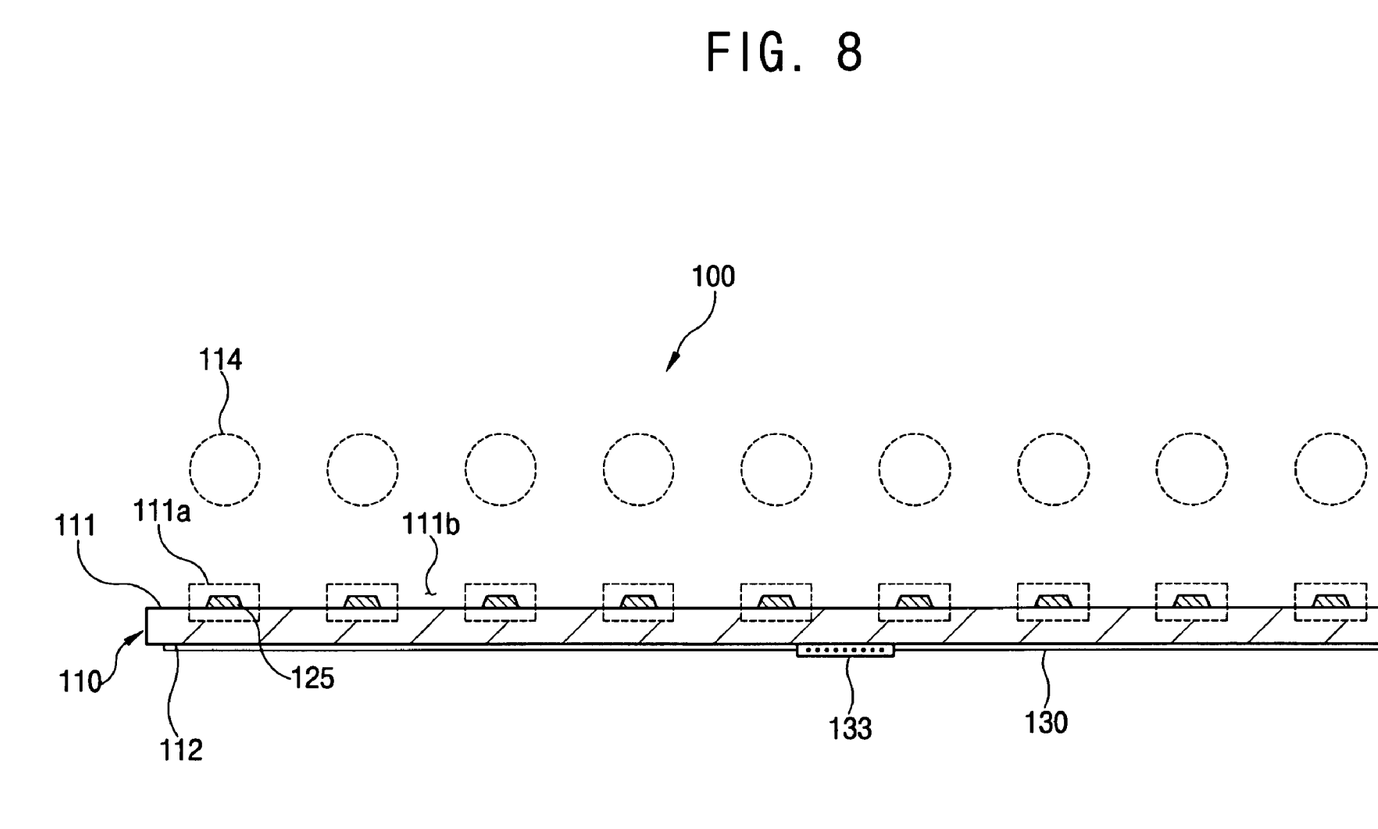
FIG. 8 is a cross-sectional view taken along the line IV-IV' of FIG. 7.

FIG. 7 is a plan view showing an apparatus for monitoring a lamp according to the present embodiment. FIG. 8 is a cross-sectional view taken along the line IV-IV' of FIG. 7.

The apparatus of the present embodiment for monitoring the lamp is same as the apparatus in Embodiment 1 except for a sensor according to the Embodiment 1. Thus, the same reference numerals will be used to refer to the same or like parts as those described in Embodiment 1 and any further explanation will be omitted.

Referring to FIGS. 7 and 8, a sensor 125 is disposed in a first region 111a of a first face 111 of a base body 110. The sensor senses a light generated from a lamp. The sensor includes a phototransistor or photodiode. The photodiode is preferably used for the sensor 125.

An output end 125a of the sensor 125 is connected to a first end of a signal transfer pattern 130. The signal transfer pattern 130 is disposed in a second peripheral region of a second face 112, thus it is preferable that the output end 125a of the sensor 125 and the first end 131 of the signal transfer pattern 130 are connected to each other through a conductive via-hole 135.

The apparatus for monitoring a lamp 100 according to the present embodiment may be effective in case that the magnetic field generated from the lamp 114 is weak or an interval between the lamp 114 and a base body 110 is great, so that sensing the status of the lamp 114 by the magnetic field generated from the lamp 114 may be difficult.

Exemplary Embodiment of System for Monitoring a Lamp

Embodiment 4

Figure 9:
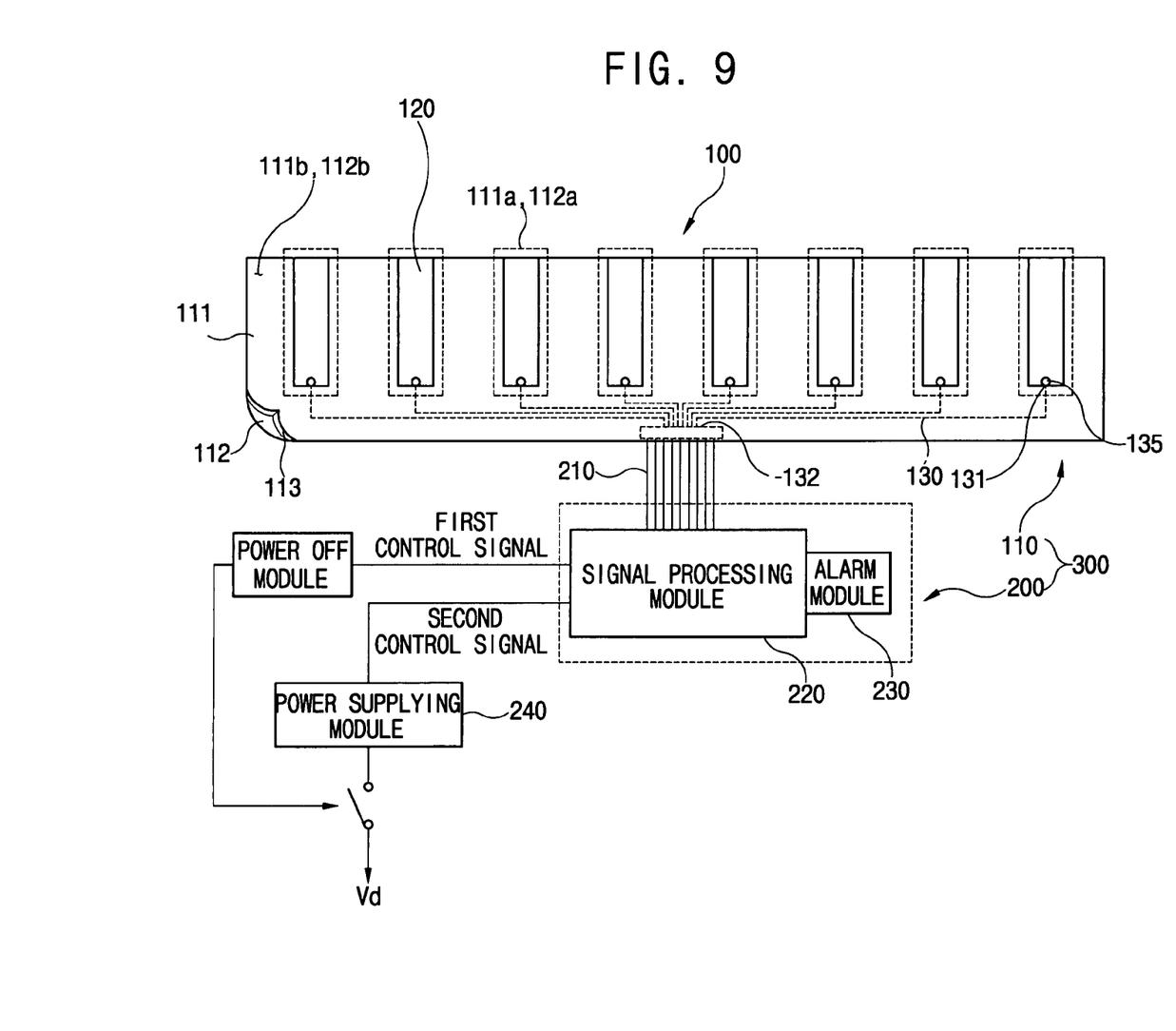
FIG. 9 is a plan view showing a system for monitoring a lamp according to Embodiment 4 of the present invention.

FIG. 9 is a plan view showing a system for monitoring a lamp according to the present embodiment.

Referring to FIG. 9, system for monitoring a lamp 300 includes an apparatus for monitoring a lamp 100 and a signal processing apparatus 200.

The apparatus for monitoring a lamp 100 includes a base body 110, a sensor 120 and a signal transfer pattern 130.

The base body 110 includes a first face 111 and a second face 112. The first face 111 is opposite to the second face 112, and the first face 111 and the second face 112 are connected to each other via a side face 113.

The first face 111 includes a first region 111a and a first peripheral region 111b. The first peripheral region 111b is a remaining region excluding the first region 111a.

The second face 112 includes a second region 112a and a second peripheral region 112b. The second region 112a is formed corresponding to the first region 111a, and the second peripheral region 112b is formed corresponding to the first peripheral region 111b.

The sensor 120 is disposed on the base body 110. The sensor 120 may be disposed on the first region 111a of the first face 111 or the second region 112a of the second face 112. The lamps are disposed on an entire surface of each of the sensors 120, wherein the lamps and the sensors 120 are separated from each other.

A metal thin film for converting the magnetic field into a current, a photodiode or a phototransistor capable of sensing the light generated in the lamp may be used for the sensor 120. According to the present embodiment, the metal thin film is used for the sensor 120. A copper thin film, an aluminum thin film or an aluminum alloy thin film may be used for the metal thin film.

The signal transfer pattern 130 is disposed on the second peripheral region 112b that is not overlapped with the sensor 120, of the second face 112.

The signal transfer pattern 130 includes a first end 131 and a second end 132 that is opposite to the first end 131.

The first ends 131 of the signal transfer patterns 130 are connected to the sensors 120, respectively. The first end 131 and the sensor 120 of the signal transfer pattern 130 are electrically connected to each other through a via-hole 135 formed on the base body 110. The second ends 132 of each of the signal transfer patterns 130 are connected to a connector 133 that is disposed on a center of the second face 112.

The sensor 120 senses the magnetic field or the light corresponding to a working status, so that the sensor 120 outputs a sensing signal to the signal transfer pattern 130. The sensor 120 and the signal transfer pattern 130 are not overlapped or crossed with each other, thus the sensing signal may not be distorted while passing the signal transfer pattern 130.

A signal processing apparatus 200 receives the sensing signal from the connector by a signal transfer cable 210. The signal processing apparatus 200 includes a signal processing module 220 and an alarm module 230. The signal processing module 220 compares the sensing signal admitted from each of the sensors 120 with a reference signal. A working property such as an optical property is slowly decreased with turn-on time elapsed. Therefore, a level of the magnetic field or a level of brightness of the light is slowly decreased with turn-on time of the lamp elapsed.

The signal processing module 220 converts an analog sensing signal admitted from each of the lamps into a digital signal, thus generates a control signal by comparing the digital signal periodically or continuously with a stored reference signal.

The signal processing module 220 compares the reference signal with the sensing signal, so that when at least one of the sensing signal levels is lower than the reference signal level, the signal processing module 220 outputs a first control signal to block a driving power $V_d$ applied to each of the lamps through the power supplying module 240. The first control signal is admitted to a power off module 250, thus driving power supplied to the lamp is blocked by the power off module 250, thereby turning off the lamp.

The signal processing module 220 compares the reference signal with the sensing signal, so that when all of the sensing signal levels are higher than the reference signal level, the signal processing module 220 outputs a second control signal to admit a driving power $V_d$ to each of the lamps through the power supplying module 240. The power supplying module 240 admits the driving power to all of the lamps by the second control signal, so that the lamp is kept turned-on.

When all the lamps are suddenly turned-off by the first control signal generated from the signal processing module 220, a user may not know the reason of the lamp being turning-off, so that the signal processing module 220 further includes an alarm module 230 notifying an extinction of the lamp after or before the lamp is turned-off. The alarm module 230 notifies the extinction of the lamp through a voice or a horn to the user. The signal processing apparatus 200 controlling the lamp by processing the sensing signal generated from each of the lamps is included to the apparatus for monitoring a lamp 100, so that normally working lamps are prevented from being damaged by sensing a lamp of which the working property is lowered and by turning-off all the normally working lamps.

EXEMPLARY EMBODIMENT OF BACKLIGHT ASSEMBLY

Embodiment 5

Figure 10:
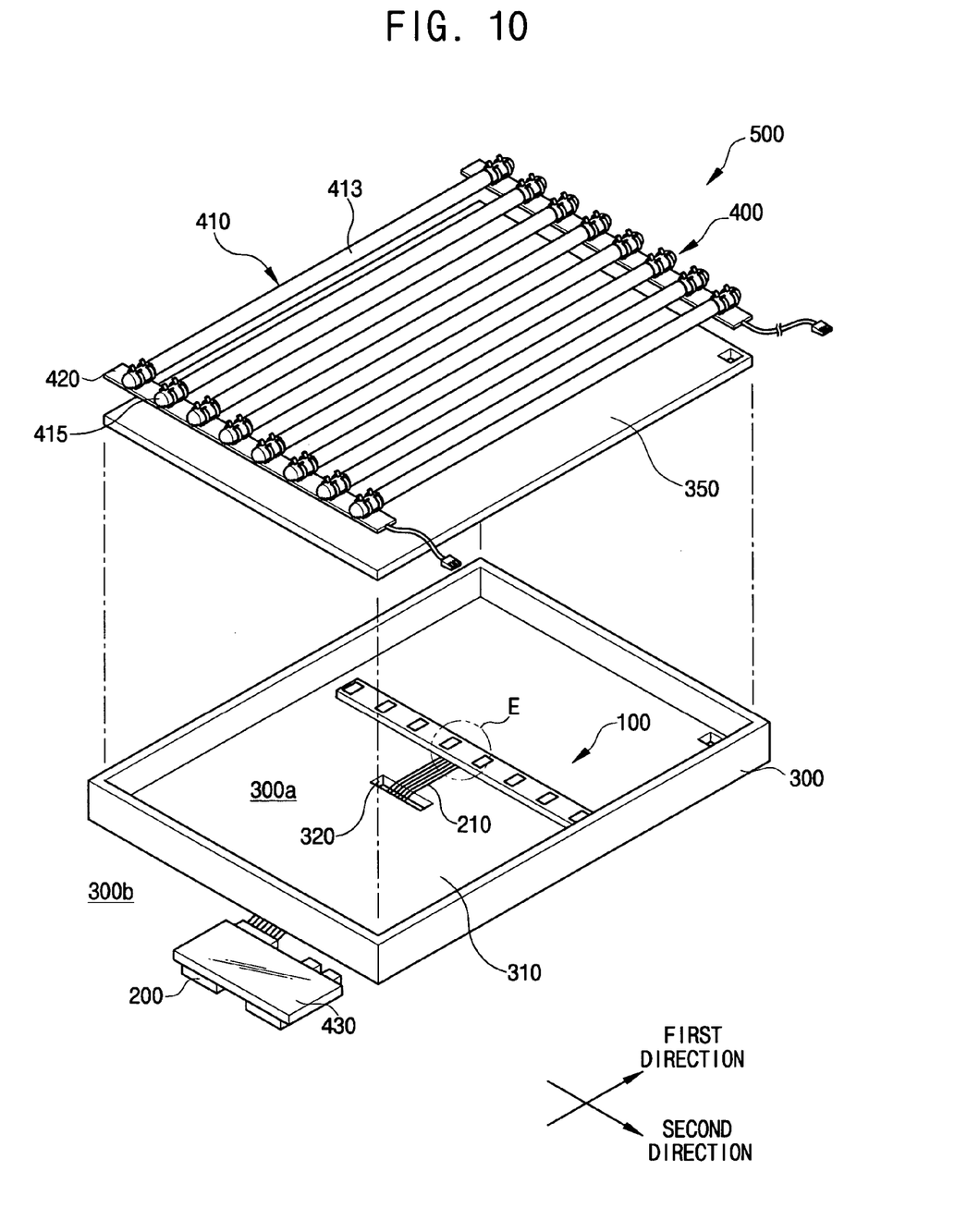
FIG. 10 is an exploded perspective view showing a backlight assembly according to Embodiment 5 of the present invention.
Figure 11:
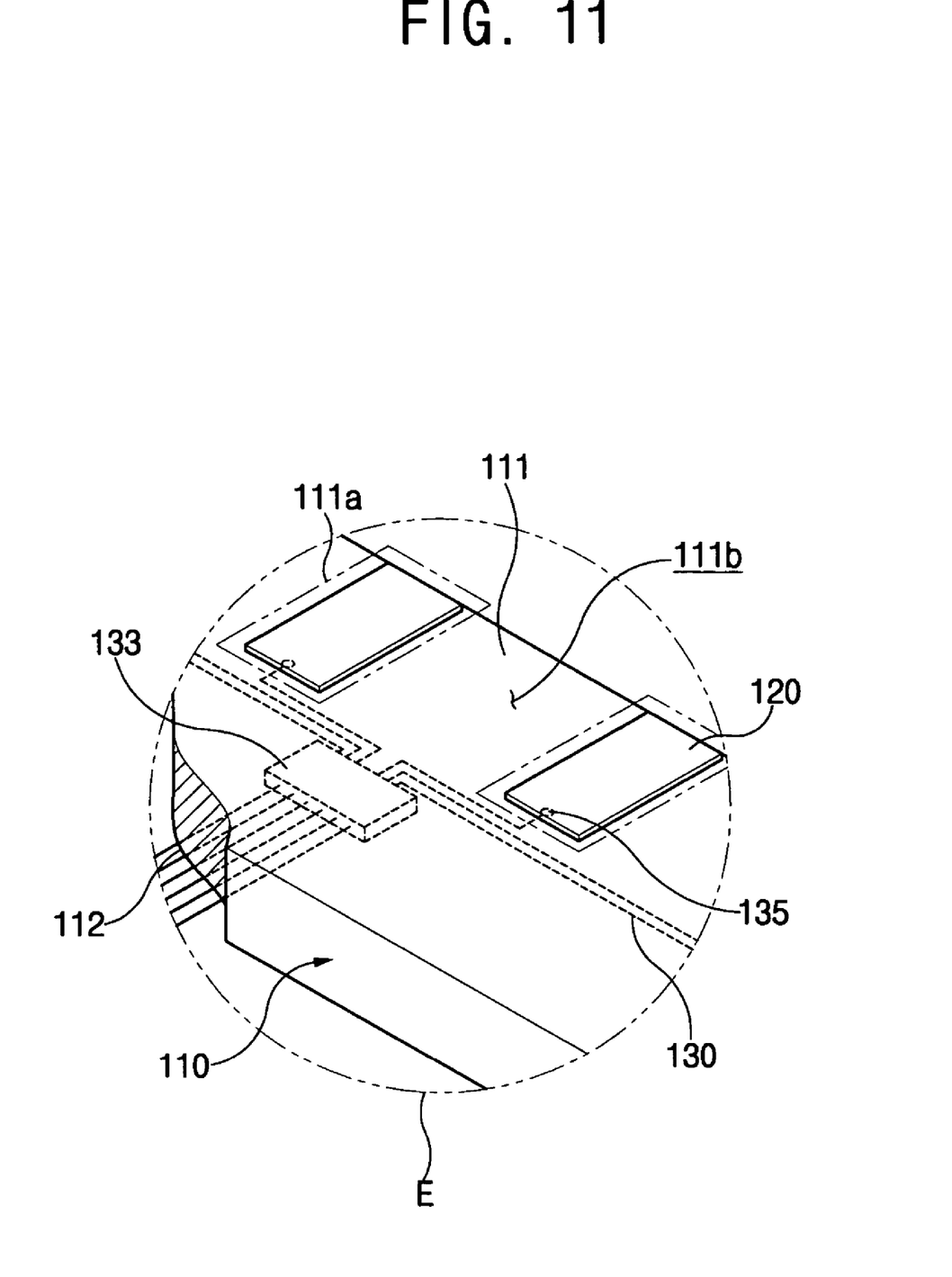
FIG. 11 is a partially enlarged view showing a part E of FIG. 10.

FIG. 10 is an exploded perspective view showing a backlight assembly according to the present embodiment. FIG. 11 is a partially enlarged view showing a part E of FIG. 10.

Referring to FIGS. 10 and 11, a backlight assembly 500 includes a receiving container 300, a lamp assembly 400, a lamp monitoring module 100 and a signal processing apparatus 200.

The receiving container 300 includes a bottom face 310. An open part 320 is formed on a part of the bottom face 310. The receiving container 300 is divided into an internal region 300a and an external region 300b by the bottom face 310. The lamp assembly 400 and the lamp monitoring module 100 are disposed in the internal region 310a, an inverter and the signal processing apparatus 200 are disposed in an external region 310b.

The lamp assembly 400 includes a lamp 410, a power transferring module 420 and an inverter 430.

At least one lamp is required, and a plurality of the lamps is used in this embodiment. According to the lamp of the present embodiment, a pair of external electrodes 415 is disposed on a surface of a lamp body 413. A fluorescent layer is coated in an inner wall of the lamp body 413, and a discharged gas is sealed in the lamp body 413. Each of the lamps 410 is disposed in parallel with each other, and generates a light by a driving power supplied from the inverter 430.

The power transferring module 420 is connected to the external electrode 415 in parallel to admit the driving power to the external electrode 415 of each of the lamps 410. The power transferring module 420 has a shape of rectangular parallelepiped plate, a clip for fixing the external electrode 415 of the lamp 410 is formed on the power transferring module 420 as many as the number of the lamp 410.

The inverter 430 elevates several volts or dozens of volts to thousands of volts. The driving power generated from inverter 430 is supplied to each of the external electrodes 415 of the lamp 410 through the power transferring module 420.

The lamps 410 are turned-on spontaneously by the driving power supplied from the power transferring module 420 or the lamps 410 are turned-off spontaneously by the blocking the driving power.

The lamp monitoring module 100 prevents the lamp 410 from being damaged or prevents the lifetime of the lamp 410 from being shortened.

The lamp monitoring module 100 includes a base body 110, a sensor 120 and a signal transfer pattern 130.

The base body 110 is disposed between a bottom face 310 and the lamps 410. The base body 110 is disposed in an inner region 300a of the receiving container 300, wherein the base body 110 is disposed in a direction substantially perpendicular to a longitudinal direction of the lamps 410.

The sensor 120 is disposed in a first region 111a of a first face 111 that is opposite to the lamp 410. The sensor 120 is disposed on the first face 111 corresponding to each of the lamps 410. The sensor 120 is extended to a same direction as an extended direction of the lamps 410. A length of the lamp 410 is shorter than a width of the base body 110.

The sensor 120 senses working status corresponding to the magnetic field or the light, so that the sensor 120 outputs a sensing signal.

The sensor 120 may be one of a metal thin film converting the magnetic field generated from the lamp 410 into a current as a sensing signal, a photodiode and a phototransistor sensing a light generated from the lamp 410.

The signal transfer pattern 130 is disposed on the second face 112 of the base body 110 that is opposite to the bottom face 310 of the receiving container 300. Each of the signal transfer patterns 130 is electrically connected to the sensor 120 disposed on the first face 111 of the base body 110. A first end of each of the signal transfer patterns 130 is electrically connected through a via-hole 135 formed on the base body 110.

The signal transfer pattern 130 disposed on the second face 112 and the sensor 120 disposed on the first face 111 are disposed so as not to be overlapped with each other. In case that the sensor 120 and the signal transfer pattern 130 are overlapped with each other, a parasitic capacitance is generated between the base body 110 and the signal transfer pattern 130, and as a result, the sensing signal outputted from the sensor 120 to the signal transfer pattern 130 is distorted.

A second end corresponding to the first end of the signal transfer pattern 130 is concentrated to a part of the second face 112, and the second ends of each of the signal transfer patterns 130 are electrically connected to a connector 133.

The signal processing apparatus 200 and the connector 133 are connected through a signal transfer cable 210. The signal processing apparatus 200 generates a control signal by comparing the sensing signal admitted from the signal transfer pattern 130 with the reference signal.

The control signal includes a first control signal or a second control signal. The first control signal is generated when at least one of levels of the sensing signal is no more than a level of the reference signal, and the second control signal is generated when the level of the sensing signal is no less than the level of the reference signal.

The signal processing apparatus 200 is electrically connected to the inverter 430. The first control signal generated from the signal processing apparatus 200 blocks the driving power supplied from the inverter 430 to the lamp 410, so that the normally working lamps 410 are turned-off.

The signal processing apparatus 200 is also connected to the alarm module. Therefore, the first control signal generated from the signal processing apparatus 200 is supplied to the alarm module, so that the voice or the horn notifying the extinction of the lamp 410 is generated from the alarm module.

A reflecting plate 350 is further disposed between the lamp monitoring module 100 and the lamp 410. In case that the sensor 120 of the lamp monitoring module 100 is the photodiode or the phototransistor, the reflecting plate 350 may further include a throughhole. The light generated from the lamp 410 may be entered into the sensor 120 through the through hole formed on the reflecting plate 350.

When at least one of the lamps is turned-off unexpectedly while a plurality of the lamps 410 generating the light used for displaying an image are operating, normally working lamps are turned-off, so that the lamp may not be damaged or the life time of the lamp is prevented from being shortened.

EXEMPLARY EMBODIMENT OF LIQUID CRYSTAL DISPLAY APPARATUS

Embodiment 6

Figure 12:
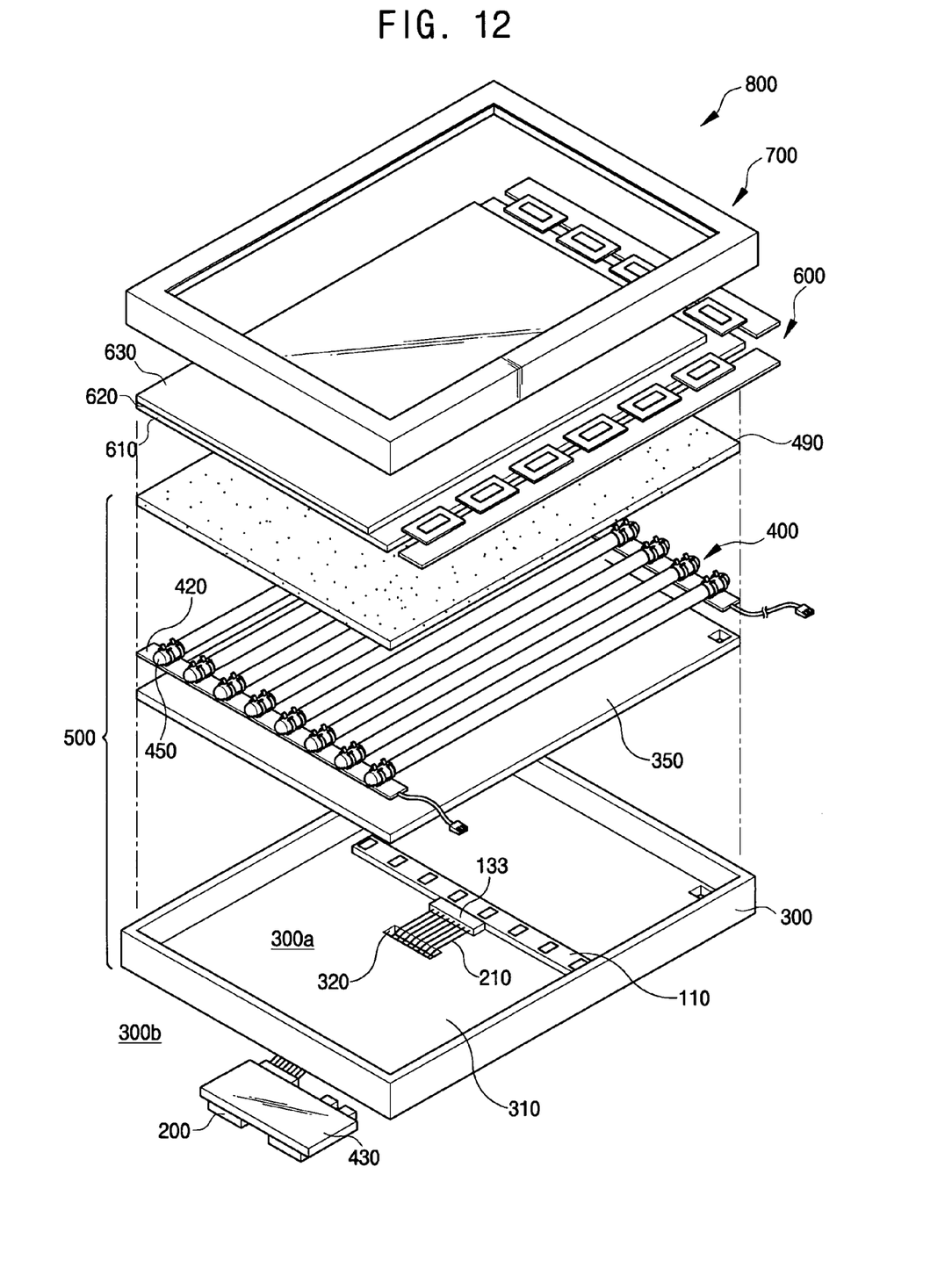
FIG. 12 is an exploded perspective view showing an LCD apparatus according to the present invention.

FIG. 12 is an exploded perspective view showing an LCD apparatus according to the present embodiment.

The liquid crystal display apparatus monitoring a lamp of the present embodiment is same as in Embodiment 5 except for a diffusion plate and a chassis. Thus, the same reference numerals will be used to refer to the same or like parts as those described in Embodiment 5 and any further explanation will be omitted.

Referring to FIG. 12, a diffusion plate 490 may be further disposed on a lamp assembly 400 of a backlight assembly 500 of a liquid crystal display apparatus 800. The diffusion plate 490 uniformizes a brightness distribution so as to mask a bright line of a light generated in the lamp assembly 400. The diffusion plate 490 is combined with a receiving container 300 as a mediator.

A liquid crystal display panel 600 includes a thin film transistor (TFT) substrate 610 and a color filter substrate 630.

The TFT substrate 610 includes a first transparent substrate, a thin film transistor and a pixel electrode. The thin film transistors are disposed on the first transparent substrate in a matrix shape. The pixel electrodes are disposed on each of the thin film transistors.

The color filter substrate 630 is opposite to the TFT substrate 610, and includes a common electrode and a color filter formed on a second transparent substrate. The common electrodes are formed on an entire area of the second transparent substrate, and face the pixel electrode. The color filter is disposed between the common electrode and the second transparent substrate, and the color filters are formed in a region corresponding to each of the pixel electrodes.

A liquid crystal 620 is disposed between the TFT substrate and the color filter substrate, thus an electric field is formed by a voltage difference between the pixel electrode and the common electrode, so that an amount of the light generated from the lamp assembly 400 may be controlled. The light that has passed through the liquid crystal 620 is reached the user through the color filter.

The chassis 700 protects the liquid crystal display panel 600 assembled to the receiving container 300, and prevents the receiving container 300 from being separated.

Since the lamps are connected in parallel, when at least one of the lamps is turned-off, normally working lamps are immediately turned-off, thereby so that the lamp may not preventing the lamp from being damaged or the lifetime from being shortened.

The connector 133 is disposed on the side face of the apparatus for monitoring a lamp 100.

The liquid crystal display apparatus of the present invention prevents the signal distortion that occurs by the overlapping between the sensing signal outputted from the sensor sensing a working status of the lamp and the sensor. Accordingly, a decrease of a monitoring efficiency may be prevented.

Having described the embodiments of the present invention and its advantages, it is noted that various changes, substitutions and alterations can be made herein without departing from the spirit and scope of the invention as defined by appended claims.

What is claimed is:

1. An apparatus for monitoring a plurality of lamps, comprising:
   a base body including a first face and a second face corresponding to the first face;
   a plurality of sensors disposed on the first face and each configured to output a sensing signal for monitoring a corresponding one of the lamps in response to a working status of the lamp;
   a noise-blocking pattern disposed on the first face between and insulated from the plurality of sensors; and
   a signal transfer pattern disposed on the second face and configured to transfer the sensing signal from the sensor.

2. The apparatus of claim 1, wherein the first face having a first region corresponding to the lamp and a first peripheral region disposed around the first region, and the second face having a second region corresponding to the first region and a second peripheral region corresponding to the first peripheral region.

3. The apparatus of claim 2, wherein the sensor is disposed on the first region and the signal transfer pattern is formed in the second peripheral region.

4. The apparatus of claim 1, wherein a first end of the signal transfer pattern is electrically connected to the sensor.

5. The apparatus of claim 4, wherein the sensor and the first end are electrically connected to each other through a conductive via-hole.

6. The apparatus of claim 4, wherein the base body further comprises a connector electrically connected to a second end corresponding to the first end.

7. The apparatus of claim 6, wherein the connector is disposed in the second peripheral region.

8. The apparatus of claim 6, wherein the connector is disposed on a side face of the base body.

9. The apparatus of claim 1, wherein at least two sensors are disposed on the first face in parallel.

10. The apparatus of claim 1, wherein the sensor is a metal thin film sensing a magnetic field generated from the lamp.

11. The apparatus of claim 10, wherein the metal thin film is selected from the group consisting of a copper thin film, an aluminum thin film, and an aluminum alloy thin film.

12. The apparatus of claim 1, wherein a width of the signal transfer pattern and an interval between the signal transfer patterns are about 0.05 mm to 0.15 mm.

13. The apparatus of claim 1, wherein the signal transfer pattern is disposed in a direction substantially perpendicular to a longitudinal direction of the sensor.

14. The apparatus of claim 1, wherein the signal transfer pattern is disposed so as not to be overlapped with the sensor when viewed from a plan view of the first face.

15. The apparatus of claim 1, wherein the noise-blocking pattern is any one selected from the group consisting of a copper thin film, an aluminum thin film, and an aluminum alloy thin film.

16. The apparatus of claim 1, wherein a portion of the noise-blocking pattern or a whole surface of the noise-blocking pattern is grounded.

17. The apparatus of claim 1, wherein the noise-blocking pattern includes a same material as in the sensors.

18. The apparatus of claim 1, wherein the sensor includes a photodiode or a phototransistor configured to sense a light generated from the lamp.

19. A system for monitoring a plurality of lamps, comprising:
    an apparatus for monitoring the lamps, including a plurality of sensors disposed on a first region of a first face in a base body and each configured to output a sensing signal in response to a working status of a corresponding one of the lamps, and a signal transfer pattern disposed on the base body and configured to transfer the sensing signal generated from the sensors;
    a noise-blocking pattern disposed on the first face between and insulated from the plurality of sensors; and
    an apparatus for processing a signal, configured to output a control signal related to the working status of the lamp by comparing the sensing signal with a reference signal.

20. The system of claim 19, wherein the signal transfer pattern is disposed so as not to be overlapped with the sensor when viewed from a plan view of the first face.

21. The system of claim 19, wherein the apparatus for processing the signal further comprises a power off module, and the power off module blocks a driving power supplied to the lamp by a first control signal when a level of the sensing signal outputted from the apparatus for processing the signal is lower than a level of the reference signal.

22. The system of claim 19, wherein the apparatus for processing the signal further comprises an alarm module configured to generate an alarm in response to the first control signal.

23. A backlight assembly comprising:
    a receiving container including a bottom face;
    a lamp assembly including a plurality of lamps disposed on an inner surface of the bottom face and generating a light, and driving power transferring module transferring a driving power to the lamps;
    an apparatus for monitoring the plurality of lamps, including a base body disposed between the bottom face and the lamps, a sensor disposed on a first region of a first face in a base body and configured to output a sensing signal in response to a working status of the lamp, and a signal transfer pattern disposed on the base body and configured to transfer the sensing signal generated from the sensor;
    a noise-blocking pattern disposed on the first face between and insulated from the plurality of sensors; and
    a sensing signal processing module configured to generate a control signal controlling on/off of the driving power supplied to the lamp in response to the sensing signal.

24. The backlight assembly of claim 23, wherein the signal transfer pattern is disposed so as not to be overlapped with the sensor when viewed from a plan view of the first face.

25. The backlight assembly of claim 23, wherein a first end of the signal transfer pattern is electrically connected to the sensor through a via-hole formed on the base body and a second end corresponding to the first end is connected to a connector disposed on the second face.

26. The backlight assembly of claim 23, wherein an insulating reflecting plate is interposed between the lamp and the lamp monitoring apparatus.

27. The backlight assembly of claim 23, wherein the sensor includes one of a photodiode and a phototransistor.

28. The backlight assembly of claim 27, wherein a throughhole receiving a light from the lamp is formed on a part of reflecting plate corresponding to the sensor.

29. A liquid crystal display apparatus comprising:
a receiving container including a bottom face;
a lamp assembly including a plurality of lamps disposed on an inner surface of the bottom face and generating a light, and driving power transferring module transferring a driving power to the lamps;
an apparatus for monitoring the plurality of lamps, including a base body disposed between the bottom face and the lamps, a sensor disposed on a first region of a first face in a base body and configured to output a sensing signal in response to a working status of the lamp, and a signal transfer pattern disposed on the base body and configured to transfer the sensing signal generated from the sensor;
a noise-blocking pattern disposed on the first face between and insulated from the plurality of sensors;
a sensing signal processing module configured to generate a control signal controlling on/off of the driving power supplied to the lamp in response to the sensing signal; and
a liquid crystal display panel fixed to the receiving container and configured to convert the light into an image light including information.

30. The system of claim 19, wherein the noise-blocking pattern includes a same material as in the sensors.

31. The backlight assembly of claim 23, wherein the noise-blocking pattern includes a same material as in the sensors.

32. The apparatus of claim 29, wherein the noise-blocking pattern includes a same material as in the sensors.

* * * * *